July 8, 1969  T. P. CURTIS  3,454,825
COMPOSITE MAGNET STRUCTURE
Filed Dec. 6, 1965
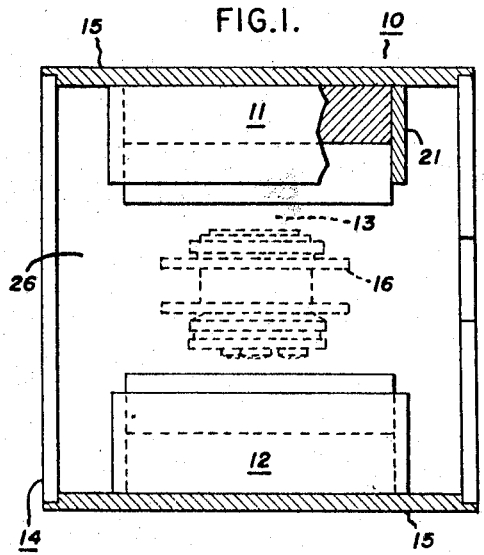
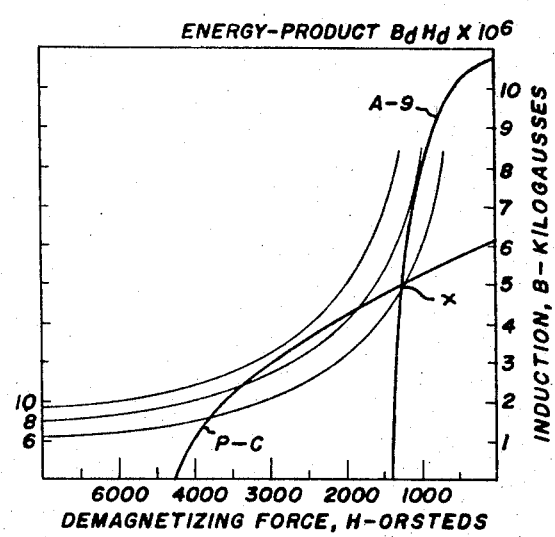
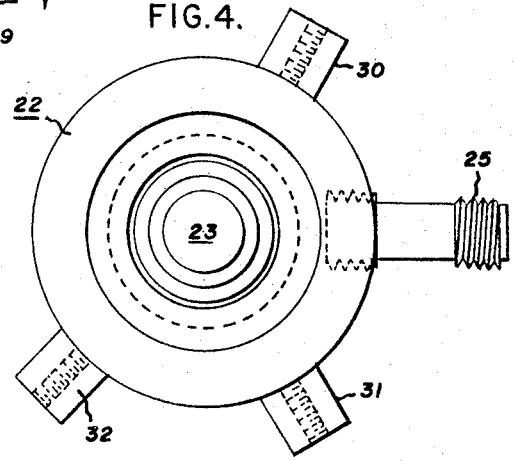
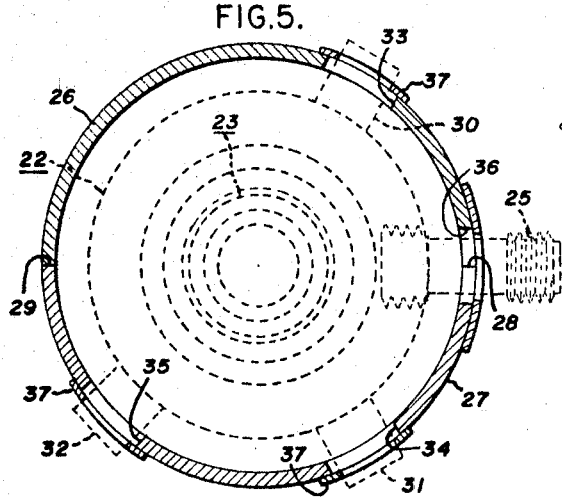
INVENTOR:
TRUMAN P. CURTIS,
BY *James J. Lichiello*
HIS ATTORNEY.

United States Patent Office 3,454,825
Patented July 8, 1969

3,454,825
COMPOSITE MAGNET STRUCTURE
Truman P. Curtis, Schenectady, N.Y., assignor to General Electric Company, a corporation of New York
Filed Dec. 6, 1965, Ser. No. 511,664
Int. Cl. H01j 25/50
U.S. Cl. 315—39.71                                4 Claims

ABSTRACT OF THE DISCLOSURE

This invention relates to a voltage tunable magnetron structure and, more particularly, to a composite magnet structure for same in which a plurality of permanent magnets of different magnetic characteristics are combined with one of low flux density adjacent the magnetron and another having higher flux density on the end away from the magnetron.

---

This invention relates to a composite magnet structure of different magnetic characteristics materials and more particularly, to combinations of a plurality of permanent magnets of different magnetic characteristics and materials utilized as composite structures for single magnet purposes.

Advances in permanent magnet technology have greatly increased applications where permanent magnets display salient and desirable advantages. At the same time this advance is permanent magnet technology has provided precise and predetermined sophisticated magnets and magnet structures for use in highly technical applications, for example electrical discharge devices, and particularly crossed field devices such as magnetrons. In many electrical discharge devices, application of some otherwise advantageous permanent magnets is limited because of their inherent large weight, and correspondingly, in electron trajectory type applications, by the necessary space requirements.

Other restrictions relate to environmental conditions including severe demagnetizing fields and torque considerations. In seeking to exercise greater control over space, weight and other mentioned restrictions, in addition to providing more definitive magnetic characteristics, other permanent magnet materials such as platinum cobalt alloys, platinum iron alloys, silver manganese aluminum alloys, manganese bismuthide, etcetera, have been developed. Wide application of the mentioned materials, particularly the platinum-containing materials, is severely limited by high cost factors. In spite of this cost restriction, the development of very small lightweight and extremely accurate electron discharge devices such as voltage tunable magnetrons, has in turn required permanent magnets also meeting necessary space, weight, and other strenuous conditions, with only the mentioned more sophisticated higher efficiency and expensive materials being available.

Accordingly, it is an object of this invention to provide an improved magnet structure.

It is a further object of this invention to provide an improved composite permanent magnet structure of different magnetic materials.

It is a still further object of this invention to provide a substitution, in part, for high cost permanent magnet material without significantly reducing the effectiveness of the magnet.

It is yet another object of this invention to provide a composite permanent magnet structure of reduced weight.

It is a still further object of this invention to provide a composite permanent magnet structure of reduced size.

It is a still further object of this invention to provide a composite permanent magnet structure of reduced cost.

It is again a further object of this invention to provide the combination of a platinum-containing magnet and a further magnet of higher flux density as a composite structure to provide the magnetic features approaching or exceeding those of a platinum-containing magnet of the same volume.

It is a further object of this invention to provide an improved composite permanent magnet structure for electric discharge devices.

It is an object of this invention to provide in an electrical discharge device a composite permanent magnet including a high coercive force low flux density material next adjacent a gap and a low coercive force high flux density material remote from said gap.

It is yet another object of this invention to provide a composite permanent magnet structure for voltage tunable magnetrons.

It is another object of this invention to provide a composite magnet structure of platinum cobalt and Alnico 9 for voltage tunable magnetrons.

Briefly described, in one preferred form this invention provides for the substitution of a part of the length of one magnet of a given unique material with a length of magnet of a different and less unique material. More specifically and for example, a longitudinally extending magnet of a platinum-containing material such as platinum cobalt material may have part of its length remote from an air gap replaced with an Alnico magnet material such as Alnico 9 with no significant reduction in flux density across said air gap.

These and other objects of this invention will be better understood when taken in connection with the following description and the drawings in which FIG. 1 is a cross sectional elevational view of one preferred embodiment of this invention;

FIG. 2 is an illustration of demagnetization curves for Alnico 9 and platinum cobalt materials in this invention;

FIG. 3 is a cross section of a voltage tunable magnetron utilizing the teachings of this invention;

FIG. 4 is an illustration of the magnetron cavity portion of FIG. 3;

FIG. 5 is an illustration of the supporting means for the cavity of FIG. 4 in FIG. 3.

FIG. 1 is illustrative of a magnet assembly 10 comprising a pair of opositely positioned spaced apart permanent magnet composite units 11 and 12 which define an air gap 13 therebetween. Magnets 11 and 12 in one form of this invention are solid right circular cylinders positioned in oposite spaced apart relationship within a suitably shaped housing 14. Housing 14 is of a magnetic material such as soft iron and formed as a hollow chamber such as a cylinder, with magnets 11 and 12 joined to the end walls 15 by soldering, brazing and other known attaching means. In this arrangement housing 14 serves as a low reluctance return path for the flux lines of the magnets.

The above structure may be utilized for various magnetic purposes and in one preferred form of this invention is adapted to have an electrical discharge device, for example a voltage tunable magnetron 16 shown in outline only, positioned in the defined gap 13. The magnet assembly provides a suitable magnetic field of proper flux density in gap 13 for operation of the voltage tunable magnetron 16.

The overall size or configuration of assembly 10 is directly related to the required magnetic field in gap 13. Ordinarily a larger gap 13 requires a larger volume of magnetic material. However, there are applications where the overall size of the assembly 10 is severely limited so that only a minimum volume is available for magnetic material, and this minimum volume magnetic material must produce maximum flux density in a given space 13. In a voltage tunable magnetron, for example, the effective diameter of the magnetron tube and the magnetic field required may dictate the diameter of the magnet. At the same time the space requirement is restrictive to magnet length. These restrictive factors do not afford much design tolerance so that choice of magnet material becomes a prime design consideration. In yet other restrictive environments or arrangements, the only known permanent magnet materials which will provide the total required flux density desired, are of such sophistication that the fabrication expense is prohibitive. In some of the latter mentioned applications the cost of sophisticated magnet materials is a very large proportion of the overall price of the assembly including an electrical discharge device therein.

It has been discovered that under certain prescribed conditions the restrictive space requirements, weight requirements, and magnetic characteristics may be met by the use of permanent magnets of different materials occupying a given volume. In other words, where formerly a given single magnet material of high cost was necessary to provide a required magnetic field, a part of that material may be replaced by a different magnetic material of lower cost and/or lower weight while at the same time providing essentially the same magnetic field as the former single material magnet. For example, it has been discovered that in some applications necessitating the use of very expensive platinum cobalt magnets, a portion of the platinum cobalt magnet may be replaced by a lower cost, lower weight magnetic material such as Alnico 9 with substantially no detrimental change in the resultant magnetic field as compared to the magnetic field of the platinum cobalt material alone. The criteria for this substitution is best explained in connection with known characteristics of magnetic materials.

The magnets being referred to in the practice of this invention are permanent magnets produced from permanent magnet materials, see Permanent Magnets and Their Applications, R. J. Parker and R. J. Studders, Wiley & Sons, New York, 1962. The graphical representation of important magnetic characteristics is denoted as the demagnetization curve of the magnet. In a permanent magnet, the field strength measured at a magnet surface has a direction opposite that of the induction inside the magnet; with positive induction the field strength is negative. The operating range of a permanent magnet, therefore, will be a portion of the second quadrant of the major hysteresis loop called the demagnetization or BH curve. Demagnetization curves for such materials as Alnico 9 and platinum cobalt are illustrated in FIG. 2 which is the second quadrant of the total hysteresis group, showing the relationship of the demagnetizing force H oersteds and the induction B gauss. Alnico 9 is a commercially available magnet material which is referred to as an improved directionalized form of Alnico 8. The several serially numbered Alnico magnets are of similar general composition and commercially available from a number of sources. Alnico 8 for example comprises about 30% to 40% by weight cobalt, 14% to 16% by weight nickel, 6% to 9% by weight aluminum, 3% to 5% by weight copper, 3% to 8% by weight titanium and the balance iron. Reference is also made to U.S. Patent 2,837,452 for a description of an Alnico magnet corresponding to Alnico 8 material. Superimposed on the curves of FIG. 2 are the contour lines of constant energy product BH in units of gauss oersteds. The closest contour line tangent to the demagnetization curve of a particular material establishes the maximum energy product. BH (maximum gauss oersteds). The maximum energy point on the demagnetization curve is the design optimum operating point of the magnet where the maximum field is obtained for a minimum magnet volume. Sloping straight lines along the lefthand side of the graph mark demagnetization coefficient slope of the load lines on which the magnetic circuit works.

In order to determine the relative dimensons of a permanent magnet of known configuration to produce a given flux density $Bg$ in an air gap a number of standard formulae may be employed such as those below noted which are derived from the mentioned Parker et al. reference.

$$LmHm - LgHg = 0$$
$$AmBm = AgBg$$
$$Vm = LgH^2gAg/BmHm$$
$$Bm = Hm = \frac{LmAg}{AmLg}$$

where:

$Lm$ = magnet length
$Hm$ = magnetizing potential of magnet per unit length
$Lg$ = length of gap
$Hg$ = air gap unit potential or gap density
$Ag$ = gap area
$Vm$ = magnet volume
$Bm$ = magnet unit density
$Bg$ = gap flux density The foregoing formulae were derived on the basis or assumption of no leakage loss in the magnet. Introduction of leakage loss in a magnet requires the formulation and use of extensive empirical methods to accurately design a magnet for specific applications. Leakage loss not only occurs in the vicinity of a magnet air gap, which is referred to as fringing flux, but also as flux radiating from the limbs of a permanent magnet. It is important to note that this combined loss may exceed as much as one half the total flux being generated by the magnet. Therefore, and as an example, to provide a given flux density across a gap defined by a magnet of extended length, each incremental portion of the magnet in a direction away from the gap generates a greater amount of flux to accommodate leakage.

It has been discovered that where a single material permanent magnet is employed to generate a predetermined flux density B in a given gap, the incremental or supporting portions of the magnet, in a direction away from the gap, which must provide an increasing flux density B do so at lower H oersted values, so that actually, the energy product BH in a remote portion of the magnet may be approached or exceeded by the BH value of a second and substantially different magnetic material. Consequently where the first material is of high density, high cost, et cetera, a part of it may be replaced with a lighter weight, low cost, different material without any significant loss of flux density in the gap. Where in fact the flux density B of the second material is significantly higher than that of the first there is a tendency and an observed occurrence, of an increased flux density in the gap, depending however on the extent of the substitution since increasing substitution leads to a limit beyond which a decrease in flux density is noted.

The substitution is best explained by means of the exemplary energy product BH curves of FIG. 2 together with an operative example. The platinum cobalt curve PC denotes a commercially available platinum cobalt permanent magnet of about 77% by weight Pt and 23% by weight Co. The Alnico 9 material curve A9 denotes an improved and higher energy form of the well known Alnico family of magnetic materials, particularly Alnico 8. As a matter of note, the density of the platinum cobalt material is nearly twice that of the Alnico 9 material. The design of a voltage tunable magnetron tube 16 with respect to the FIGS. 1 and 3, in conformance with space restrictions imposed on housing 11, resulted in the use of magnet assemblies 11 and 12 comprising solid cylinders of about 1.0 inch diameter and about 0.435 inch length. The housing 14 including end plates 15 is approximately 1.612 inch length (and 1.625 inch diameter) thus providing a defined gap or space 13 between magnet faces of about 0.596 inch.

The flux density required in space 13 was about 2500 gausses, a condition denoting platinum cobalt as one optimum if not necessary requirement. As mentioned in the foregoing discussion, however, incremental magnet portions more remote from the gap 13 are required to have greater flux density to accommodate or make up for leakage loss. These incremental portions thus operate on a higher portion of the BH curve. Because of the significant dissimilarities of the PC and A9 materials, their respective energy product BH curves intersect at X in the second quadrant as illustrated in FIG. 2. This intersection is significant because it represents that, at points higher on the PC curve than X, the energy product BH of A9 is decreasing at a lesser rate than the energy product BH of the platinum cobalt material. In other words, at corresponding points along the curves from the intersection X to the B ordinate, for each increment of decreasing H oersteds the corresponding flux density for the A9 material is higher than the corresponding flux density for PC material. The flux density B for the A9 material is therefore greater than the flux density B for the PC material for all points between the intersection X and the B ordinate.

The conditions described indicate that A9 material may be substituted for part of the PC material for portions of the curves of the materials beyond the intersection point X, or beyond this point where the flux density of the A9 material is greater than the flux density of the PC material at comparable positions. For example, considering the PC and A9 material and assuming an accurate measuring means measuring the flux density produced by succesive incremental discs of PC material in a direction away from gap 13 in FIG. 1, it will be noted that at a given length along the PC magnet the flux density is substantially that of A9 material. The limit of this length is denoted by the point of intersection X of the two curves. From that point, i.e., the established length or the intersection X, further incremental discs may be of A9 material rather than of the PC material. Because of the fact that the flux density B increases for the A9 material much more rapidly than the flux density B of the PC material, for decreasing H values, the substitution of A9 material may provide an increase in flux density at the working end of the magnet, or may shorten the required length established by the PC material alone.

In order to provide effective substitution the intersection point X must be correlated with an appropriate magnet dimension particularly the length of the magnet at which the incremental flux density is about equal to that of the A9 material. Several empirical relationships may be derived for specific applications including incremental substitution and appropriate flux density measurements. As one example, the flux density of the same configuration magnet of a different material may represent the two end values of a flux density curve. By substituting a portion such as one half of the PC material with A9 material and measuring the resultant flux density of the working end of the PC material, an intermediate point will be established. One or more of these intermediate points will determine a length of the substituting A9 material beyond which a decrease in the obtainable flux density results.

The intersection point X was found to be correlated to about one half the length of one of the magnet assemblies 11 or 12 of FIG. 1, and a substitution was made of Alnico 9 for the magnet portions 17 and 18 remote from gap 13. The magnet portions 17 and 18 were placed in tight engagement with each other at the smooth cylinder end faces and suitably soldered. The joint may also be brazed or otherwise mechanically joined. Results indicate no diminishing of flux density across the gap 13, a substantial weight saving, about 50 grams, and a reduction in magnet cost by a factor of about 40%. Actual measurement of flux density in gap 13 before substitution was about 2360 gauses and after substitution about 2380 gauses.

It is not necessary that the magnets be cylindrical or both parts symmetrical for the substitution, depending to some extent on losses resulting from the joint and different configurations. Accordingly, some applications may warrant interfitting parts such as concentric sleeves and cylinders, laminations and a variety of other juxtaposed parts. However, the combination should provide passage of flux from the higher flux density material through the lower flux density material where the working face or portion of the magnet assembly is defined by the lower flux density material. This is exemplified in one operative embodiment of this invention by the concentric abutting relationship of the A9 and PC magnets in FIGS. 1 and 3 wherein magnet 17 is A9 material and magnet 18 is PC material. A simple measurement of flux density at a given gap will be indicative of the effects of the joining of dissimilar materials.

The substitution may be made when it is demonstrated that the BH curve for the primary material next adjacent the gap intersects a BH curve of another material the BH curve of which is higher or is rising faster, with respect to flux density, that that of the primary material. The substitution may well depend, however, on the availability, cost and other known characteristics of the substituting material. For example, where two materials are not of substantially different costs or magnetic characteristics it may not be economically or technically advisable to make substitutions.

The substitution is made remote from the gap or pole of the magnet such as for example a pole piece or portion of platinum cobalt and an adjacent portion of Alnico 9. However, more than one substituting material may be employed to provide a graded magnet the prime purpose of which is not primarily to increase flux density at the gap, although this is contemplated and has been observed, but to bolster the pole material by substitution of a different material remote portions to gain size, weight, cost and operating advantages without diminishing the necessary flux density at the gap. Accordingly, in many magnet applications where magnet poles are employed for electron beam focusing, a small portion of a material such as platinum cobalt adjacent the gap leads to a significant magnetic characteristic advantage. The extent of substitution, as correlated to magnet length, should be equal to or less than the length of material which bears a relationship to the distance between intersection point X of FIG. 2 and the B axis of the second quadrant. In some more limited applications, however, where there is considerable overlapping of the curves to the left of intersection X and where design requirements have provided a magnet of higher BH than required, substitution may extend into the area to the left of intersection X.

One operating embodiment of this invention is illustrated in FIG. 3 in the form of a magnetron 20. Magnetron 20 has the same dimensions as given for FIG. 1 as well as the same parts which bear similar numerals. Housing 14 includes magnet assemblies 11 and 12 surrounded by a temperature compensating sleeve 21. Supported between magnet assemblies 11 and 12 is an RF circuit 22 which contains a magnetron tube 23 similar in structure to the magnetron tube disclosed in U.S. Patents 2,973,455 Marlowe, 3,020,445 Weinstein, and 3,020,446 Bessarab, each assigned to the same assignee as the present invention. An RF output loop 24 connects the circuit 23 to an RF output connector 25.

One feature of the magnetron 20 is that the cylinder part of housing 14 is made in the form of a pair of half shells 26 and 27 (not shown) joining or meeting at the edges 28 and 29. These shells are employed to adjustably support the circuit 22. As illustrated in FIG. 4 the circuit 22 includes three circumferentially spaced lugs 30, 31 and 32. The circumferential spacing in one preferred embodiment of this invention is an arc of 60° between lug 30 and connector 25, an arc of 60° between connector 25 and lug 31, and an arc of 75° between lugs 31 and 32. These lugs 30, 31 and 32 as well as connector 25 pass through enlarged openings in the cylindrical housing 14.

FIG. 5 is a view only of housing 14 of FIG. 3 taken along line 55 with the circuit 22 in phantom. As illustrated, lugs 30, 31 and 32 as well as connector 25 pass through enlarged openings 33, 34, 35 and 36 respectively, opening 36 being defined by half openings in each shell 26 and 27. The half shell arrangement facilitates assembling the illustrated parts. For example, half shell 26 is assembled with end caps 15 and the magnet assemblies 11 and 12. Thereafter circuit 22 and connector 25 together with the tube 23 potted in place is inserted into the remaining half shell 27 so that lugs 31 and 32 and connector 25 are positioned within their respective openings. Following this assembly the shell 27 and circuit subassembly is inserted into the shell 26 as illustrated in FIG. 5 with lug 30 projecting through its opening 33.

For adjustment purposes the magnetron is supported in a suitable fixture which fixes the housing 14 in position and permits omnidirectional movement of lugs 30, 31 and 32 as well as connector 25 to provide maximum correlation between tube 23 and the magnetic field passing therethrough. The assembly is sealed by soldering or brazing at mating edges 28 and 29 while the circuit is fixed in position by means of curved flat washers fitting tightly about lugs 30, 31 and 32 and connector 25, flush with housing 14 and soldered or brazed to both. An example of one such washer is illustrated as 37 in FIG. 5.

A further form of tuning in this invention relates to changing of the impedance of a transmission line. Different dielectric materials have been utilized adjacent the output loop 24 to provide different impedances. Once the tube is assembled, however, it is difficult to effectively change impedance by changes internally of the tube. In the connector 25 of FIG. 3 a suitable dielectric cylinder 38 is positioned about the coaxial connector 39. It has been discovered that impedance matching may be obtained by changing the material of cylinder 38 to such materials as boron nitride, forseterite, alumina, ferrite, and combinations of these materials with Teflon. This substitution may take place by merely removing coupler 25 and inserting a new cylinder or a combination of cylinders of different materials. Other adjustment means may take the form of changing the effective length of cylinder 38 by adding short sections or washers to either end preferably the outer one. Furthermore, means may be provided to adjustably move cylinder 38 axially for better impedance matching.

While this invention has been described with reference to particular and exemplary embodiments thereof, it is to be understood that numerous changes can be made by those skilled in the art without actually departing from the invention as disclosed, and it is intended that the appended claims include all such equivalent variations as come within the true spirit and scope of the foregoing disclosure.

What is new and desired to be secured by Letters Patent of the United States is:

1. A voltage tunable magnetron assembly comprising in combination,
    (a) a housing member of magnetic material,
    (b) a discrete pair of cylindrical permanent magnet assemblies oppositely positioned and retained in said housing to define a gap therebetween,
    (c) means including said housing to define a low reluctance return path for said pair of magnet assemblies,
    (d) a voltage tunable magnetron positioned in said gap to interact with the magnetic field therein,
    (e) at least one of said magnet assemblies comprising a coaxial substantially coextensive pair of similar cross section abutting magnets of different magnetic materials one of which is adjacent said gap and the other of which is remote from said gap,
    (f) the BH curves of said magnets of different material intersecting,
    (g) the remote magnet BH curve rising higher in flux density, with decreasing H oersted values, toward the common B ordinate of said curves than the curve of said magnet adjacent said gap,
    (h) the point of intersection of said curves being correlated to the individual length of said magnets so that said other magnet has a flux density along substantially its total length higher than the flux density at the said point of intersection,
    (i) the point of intersection of said curves representing a limited region along the length of said magnet assembly beyond which said other magnetic material is utilized.

2. The invention as recited in claim 1 wherein said magnet adjacent the said gap contains platinum.

3. The invention as recited in claim 1 wherein said magnet adjacent said gap contains platinum and cobalt, and said abutting magnet includes Alnico material.

4. The invention as recited in claim 3 wherein said Alnico material is Alinco 9.

References Cited

UNITED STATES PATENTS

| | | | |
|---|---|---|---|
| 2,936,408 | 5/1960 | De Bennetot | 335—306 |
| 2,949,569 | 8/1960 | Pierce et al. | 335—302 |
| 3,225,249 | 12/1965 | Krug | 315—39.71 |

FOREIGN PATENTS 670,095 9/1963 Canada.

OTHER REFERENCES

"Modern Hard Magnetic Materials," by Hoselitz, Journal of Scientific Instruments, vol. 23, No. 4, April 1946, pages 65–70 relied upon.

HERMAN KARL SAALBACH, *Primary Examiner.*

S. CHATMON, JR., *Assistant Examiner.*

U.S. Cl. X.R.

335—210, 304